July 29, 1952  J. H. ARMSTRONG ET AL  2,604,777
FLUID CONTROL SHOCK TESTING DEVICE
Filed Aug. 5, 1949  7 Sheets-Sheet 1
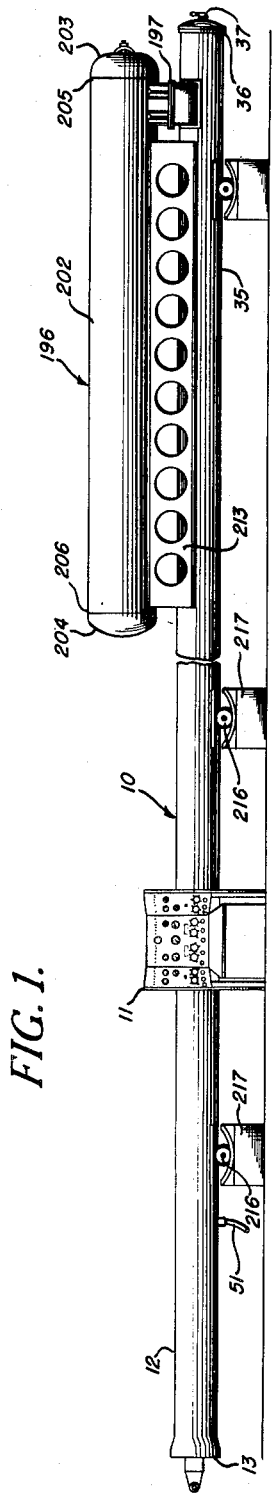
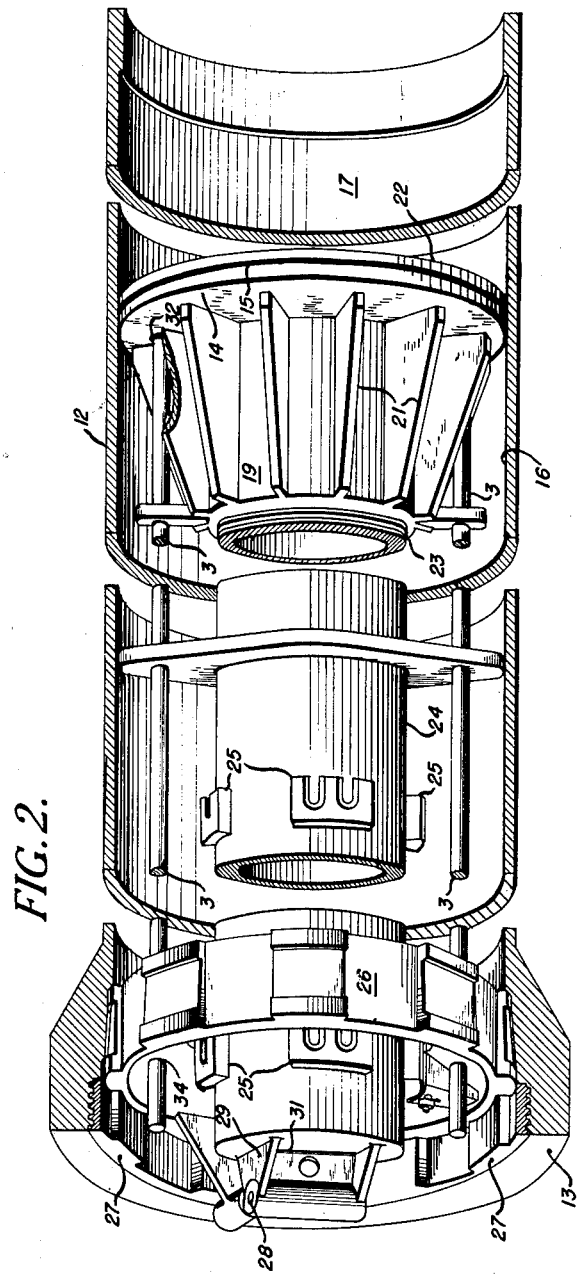
FIG. 1.
FIG. 2.
Inventors
J. H. ARMSTRONG
D. E. SULLIVAN
By M. O. Hayes
Attorney July 29, 1952 J. H. ARMSTRONG ET AL 2,604,777
FLUID CONTROL SHOCK TESTING DEVICE
Filed Aug. 5, 1949 7 Sheets-Sheet 2

Inventors
J. H. ARMSTRONG
D. E. SULLIVAN
By M. C. Hayes
Attorney

Inventors
J.H. ARMSTRONG
D.E. SULLIVAN
By M.C. Hayes
Attorney

July 29, 1952 J. H. ARMSTRONG ET AL 2,604,777
FLUID CONTROL SHOCK TESTING DEVICE
Filed Aug. 5, 1949 7 Sheets-Sheet 5

Inventors
J. H. ARMSTRONG
D. E. SULLIVAN

By M. O. Hayes

Attorney

July 29, 1952  J. H. ARMSTRONG ET AL  2,604,777
FLUID CONTROL SHOCK TESTING DEVICE Filed Aug. 5, 1949  7 Sheets-Sheet 6

Inventor
J. H. ARMSTRONG
D. E. SULLIVAN

By M. O. Hayes

Attorney

July 29, 1952 J. H. ARMSTRONG ET AL 2,604,777
FLUID CONTROL SHOCK TESTING DEVICE
Filed Aug. 5, 1949 7 Sheets-Sheet 7

Inventor
J. H. ARMSTRONG
D. E. SULLIVAN
By M. A. Hayes
Attorney

Patented July 29, 1952

2,604,777

UNITED STATES PATENT OFFICE 2,604,777

FLUID CONTROL SHOCK TESTING DEVICE

John H. Armstrong and Donal E. Sullivan,
Washington, D. C.

Application August 5, 1949, Serial No. 108,834

10 Claims. (Cl. 73—12)

(Granted under the act of March 3, 1883, as
amended April 30, 1928; 370 O. G. 757)

This invention relates generally to test apparatus and more particularly to a device of this character adapted to accelerate and decelerate, under controlled pneumatic pressures, the object under test for the purpose of determining the effect of shock thereon.

Heretofore, considerable difficulty has been encountered in the testing of certain types of naval ordnance particularly those devices intended for use under conditions of acceleration shock such, for example, as projectile fuzes, torpedo controls and high altitude aircraft launched mines, or the like. Frequently field testing of such apparatus results in either the loss of the equipment or such extensive damage thereto as to render it valueless as a source of test information.

For several years the Government has been interested in the development of equipment and the perfection of testing techniques therefor whereby the testing of various types of ordnance may be conducted in the laboratory rather than in the field as heretofore. Service evaluation wherein the completed weapons are subjected to performance tests duplicating the conditions of actual use must, of course, be the final step in development, but in the preliminary stages the advantages of controlled laboratory shock simulation has proven invaluable.

It has been frequently demonstrated both experimentally and analytically that laboratory apparatus for duplicating field shock conditions does not necessarily simulate exactly the extreme shock parameters of each particular case, for example, short impulsive velocity changes are known to produce the same response in a system of relatively low natural frequency as those resulting from lower acceleration and longer duration pulses of the same total energy. By providing a test instrument in accordance with the present invention, wherein the acceleration of the object under test may be accurately controlled for producing the exact shock curve desired, a far wider range of laboratory shock application may be obtained than with instruments of the type heretofore devised.

According to the shock testing apparatus of the present invention a testing device in the form of an air gun is provided wherein a piston carrying the part to be tested is secured against movement within the barrel section of the gun by means of a piston releasing assembly having arranged therein a plurality of steel balls adapted to be forced inwardly into locking engagement with the piston by movement of a hydraulically controlled sleeve. After air pressure has been applied to the rear face of the piston, the balls are operated to ball releasing position whereupon the piston is disengaged to accelerate within the barrel before the expanding air. Compression of the air within the closed barrel section ahead of the piston serves to bring the piston to rest. Such an arrangement, by providing for the deceleration of the piston over a greater distance than the initial travel of the piston during the acceleration thereof, cushions the piston at the end of the stroke and permits the recovery of the test piece without it undergoing secondary shock condition comparable in severity to those under study. Accurate control of the shape of the acceleration time curve is obtained by controlling the air density in the barrel volume ahead of the piston by either increasing or reducing the pressure thereof to a value above or below atmospheric pressure, as the case may be, relative to the acceleration pressure.

It is an object of the present invention to provide a shock testing device adapted to accelerate and thereafter decelerate an object under test to determine the effect of shock thereon.

Another object of the present invention is to provide new and improved shock testing apparatus which may be operated under controlled conditions to accelerate an object to be tested in a manner to impart selectively shock effects thereto simulating the shock effects received by the object under actual conditions of service.

A further object is to provide a new and improved test device wherein the peak acceleration and the rate at which the acceleration peak is attained may be controlled independently.

A further object is to provide new and improved apparatus for subjecting ordnance devices to shock effects which simulate the effects of shock received thereby under conditions of transport and service.

A still further object is to provide a shock testing device of this character adapted for testing a wide variety of ordnance devices by applying thereto a wide range of shock parameters corresponding to those encountered in the service use of such devices.

An additional object is to provide a shock testing device of an air gun type wherein a piston carrying the device to be tested is accelerated within the barrel of the gun by air pressure applied thereto and decelerated by air compressed in the barrel by movement of the piston therein.

Other objects and many of the attendant advantages of this invention will be readily appreciated as the same becomes better understood by reference to the following detailed description when considered in connection with the accompanying drawings wherein:

Fig. 1 is a view in elevation of the test gun of the present invention and the control panel therefor;

Fig. 2 is a view partly in section and partly in elevation of the breech end of the gun and the arrangement for adjusting the bulkhead therein;

Figure 3:
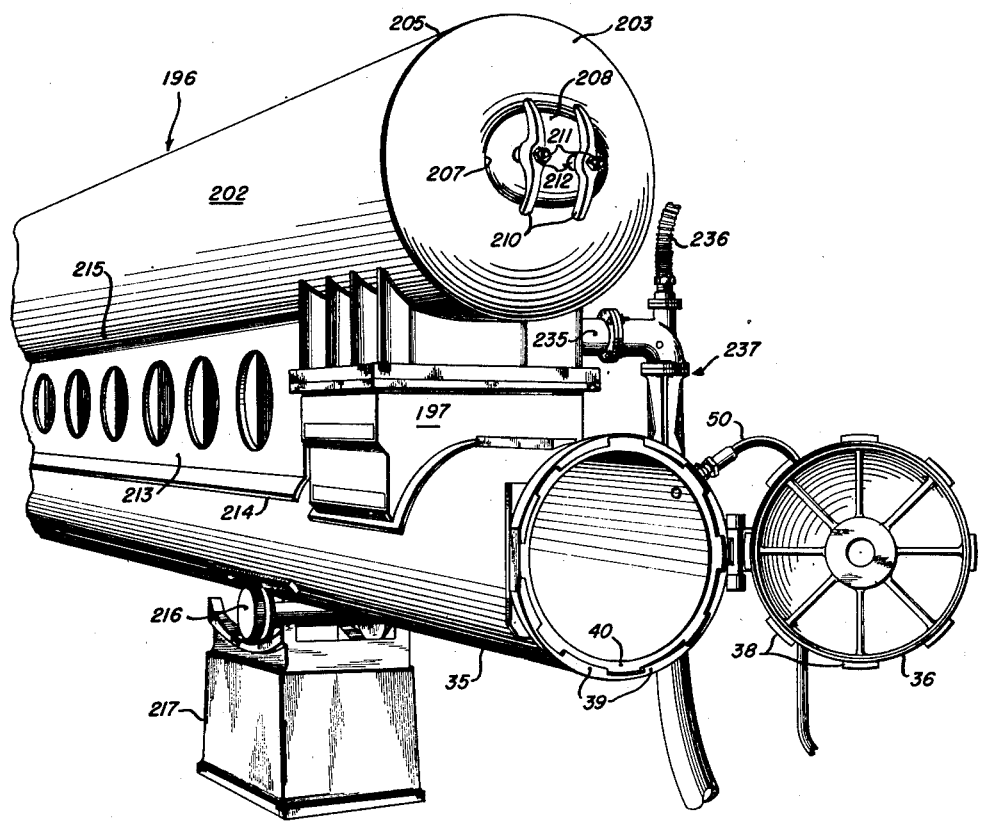
Fig. 3 is an isometric view of the forward end section of the gun and tank supported thereby with the closure cap in open position.

Referring now to the drawings and more particularly to Fig. 1 thereof, the test gun generally designated 10 is shown in operative arrangement with respect to the control panel 11 therefor upon which is mounted various gauges, valves and electric switches for controlling the operation of the gun, as will become more clearly apparent as the description proceeds.

The gun is comprised of an elongated barrel 12 of an internal diameter sufficient to accommodate therein the largest of the objects to be tested, a diameter of 21 inches having been found to be generally satisfactory. The barrel may be made from a single tubular member or in sections, as desired, to thereafter be secured together in any suitable manner as by bolting, welding or the like.

What will be hereinafter referred to as the breech end of 13 of the gun is shown in Fig. 2 as closed by a bulkhead 14 having therein a sealing O ring 15 formed preferably from rubber or the like adapted for maintaining a pressure seal between the bulkhead and the barrel bore 16 thereby forming a closure for one end of a high pressure chamber 17 made variable in volume by movement of the bulkhead either to or from a ball release assembly, generally designated 20, Fig. 6, fixedly secured within the barrel ahead of the bulkhead as by stud screws 18.

Extending rearwardly from the bulkhead and preferably formed integrally therewith is a tubular collar 19 having thereon a plurality of radially arranged ribs 21 adapted to connect with and support the periphery of the bulkhead against air pressure applied to the forward face 22 thereof from within the high pressure chamber 17.

The inner surface of collar 19 is suitably threaded for receiving therein the correspondingly threaded end section 23 of a bulkhead adjusting shaft 24, the shaft having thereon spaced groups of radially arranged lugs 25 adapted to lock the shaft and bulkhead in a predetermined fixed position of adjustment within the barrel by means of an inner connecting annular breech plate 26 releasably secured within the barrel opening as by a threaded ring section 27. The plate 26 having thereon inwardly projecting lugs suitably arranged to connect in a conventional manner with the lugs 25 of the shaft as the shaft is rotated therein by a rod or like tool (not shown) inserted within opening 28 provided therefor in bracket 29 secured to the rear end face of the shaft as by welding thereto at 31, the tool being thereafter applicable to withdraw or force inwardly the bulkhead into the barrel, as the case may be, to the position of bulkhead adjustment desired. Minor adjustment of the bulkhead within the barrel is obtained by rotating the shaft 24 within its threaded connection with collar 19 thereby to cause the shaft to move into or out of the collar for selectively altering the position of the bulkhead with respect to the position of the shaft as determined by the locking lugs 25 thereon.

To prevent rotation of the bulkhead with the shaft as the lugs 25 thereon are disengaged of the lugs of the plate or, as minor adjustments are made in the position of the bulkhead as the shaft is rotated within the collar 19 thereof, a pair of positioning rods 3 are rigidly fastened to the rear end face of the bulkhead, as at 32, to extend rearwardly therefrom through openings 34 provided therefor in the fixed breech plate 26 and are adapted to extend outwardly from the barrel as the bulkhead is retracted. The bulkhead is secured in this manner against rotation within the barrel but left free for longitudinal movement therein.

The forward end portion 35 of the barrel, as shown in Fig. 3, is closed as by a concavo-convex cap piece 36 of the type commonly employed to close the breech end of a torpedo launching tube or the like, the cap being so constructed and arranged that the handle portion 37 thereof is applicable to rotate the cap for causing the meshing of wedge shaped lugs 38 thereon with correspondingly formed lugs 39 provided in the barrel opening thereby to cause the cap to be drawn tightly against sealing ring 40 for establishing a pressure seal between the cap and barrel body.

Figure 4:
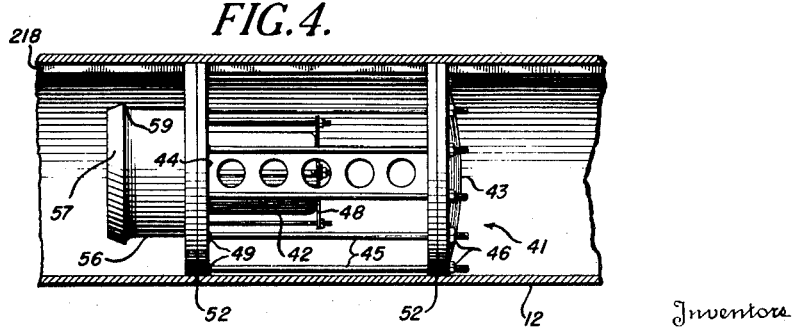
Fig. 4 is a view in cross section through the barrel showing the structure and arrangement of the piston therein.

A test piston assembly generally designated 41, Fig. 4, and adapted for mounting therein, as by a clamp structure 48, the part 42 to be tested, is formed in the manner of a cage, the two end sections 43 and 44 thereof, which will hereinafter be referred to as the forward end section and base section respectively, are connected as by a plurality of tubular rods or shafts 45 fixedly secured to the base end section 44 of the piston as by welding thereto at 49 while being releasably secured to the forward end section 43 of the piston as by nuts 46 thereby providing a piston structure sufficiently rigid to withstand shock of acceleration while having the quality of lightness required thereof to accelerate and decelerate quickly under the conditions of use.

The piston is admitted to the barrel through the cap equipped end 35 thereof to be gradually driven in the direction of the release mechanism by compressed air admitted to the barrel volume ahead of the piston through a connection 50 after a second port 51 behind the piston is opened for exhausting into the atmosphere the air that would otherwise be trapped between the piston and release 20. Gasket rings 52 formed preferably from leather or the like, are arranged about the periphery of the base and forward end sections of the piston 44 and 43 respectively, thereby providing pressure sealing connections between the piston and inner barrel surface, as the piston is moved therethrough, the gaskets being respectively secured to the ends of the piston by annular rings 53 drawn into clamping engagement with the gaskets by screws 54, Figs. 4 and 12.

Extending rearwardly from the piston base and secured thereto in any suitable manner as by threads 55 is a hardened steel tubular link 56 having thereon an inclined surface 57, effective, as the link moves into an annular recess 48' provided therefor in the release assembly, to cam outwardly a plurality of radially arranged balls 58 disposed therein and adapted to thereafter be driven inwardly behind an extending flange portion 59 of the link to lock the piston with the release mechanism by forward movement of a cylindrical locking sleeve 60, as will become more apparent as the description proceeds.

Figure 5:
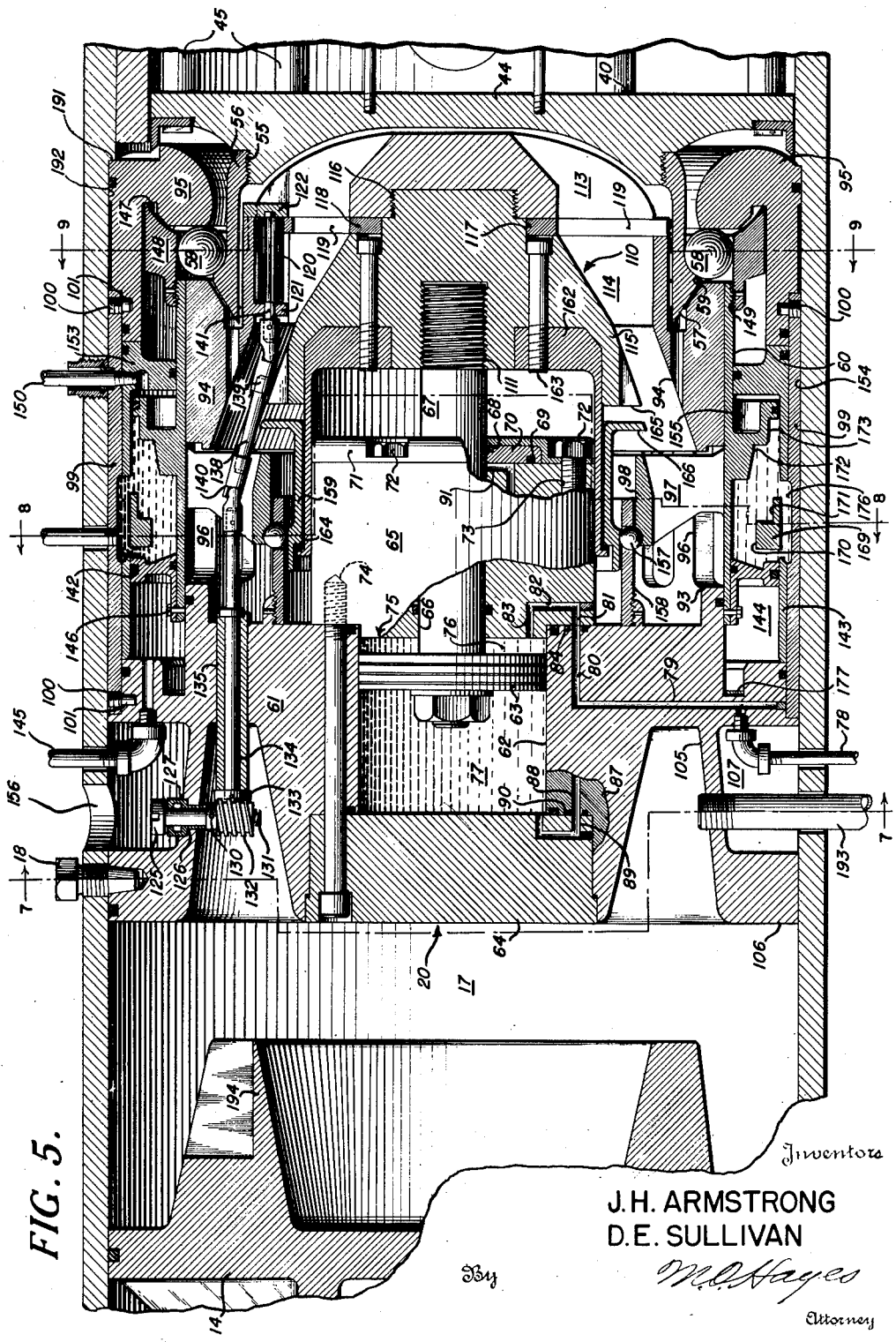
Fig. 5 is a view partly in section and partly in elevation of the release mechanism arranged in the barrel with the test piston shown in locked position therewith.

The release mechanism 20, Fig. 5, is comprised of an annular chassis member 61 having therein a centrally arranged bore 62, the walls thereof being preferably honed for allowing free movement therein of a closely fitting piston member 63. The respective ends of the cylinder are closed as by cap pieces 64 and 65 drawn thereto as by bolts 74, the latter cap having therein an annular opening 66 through which outwardly extends the shaft portion 67 of the piston 63. A pressure seal is maintained about the piston shaft by O ring gaskets 68 and 69 arranged within annular grooves provided therefor in an annular plate member 70 secured to the forward face of the cap as by a cover plate 71 through which bolts 72 extend for threadedly connecting with the cap piece 65 as at 73, to provide an assembly hereinafter referred to generally as the hydraulic cylinder 75.

Fluid, such, for example, as oil or the like, is admitted to the respective volumes 76 and 77 of the cylinder through respective fluid circuits therewith, for example, the arrangement of intersecting bores 78, 79, 80, 81, 82 and 83 comprising the circuit to the volume 76, as apparent from Fig. 5. A pressure seal is maintained about the point of intersection of bores 80 and 81 as by an O ring 84 arranged within an annular recess provided therefor in the chassis face, the ring being compressed about the connection of the bores as the cap piece 65 is drawn by bolts 74 to the forward face of the chassis.

A similar circuit is provided for establishing a fluid connection with the rear volume 77 of the cylinder 75, the circuit being shown in part by the cutaway section 87 disclosing bores 88 and 89 as they intersect within an O ring 90 arranged in the aforedescribed manner to form a sealing connection about the junction of the bores 88 and 89 as the cap piece 64 is drawn to the cylinder opening.

A circuit, similar in arrangement to those connecting volumes 76 and 77 of the hydraulic cylinder, is provided for making connection with the atmosphere from an annular recess 91 provided in the forward cap piece 65 adjacent to the piston shaft whereby high pressure air, which might escape beneath the O rings 68 and 69 from within the release mechanism, is exhausted from the system before entering the forward volume 76 of the cylinder to possibly cause premature operation thereof.

Secured in a suitable manner, as by bolts 92, to the forwardly extending flange portion 93 of the chassis, is a ball retaining ring 94 arranged in face adjacency to a forward housing 95 thereby forming an annular recess therebetween wherein are retained locking balls 58. The flange 93 is provided with a plurality of lateral slots 96, Figs. 5 and 8, within which are movable spokes 97 forming an integral connection between the release sleeve 60 and an annular ring portion 98 thereof, the said spokes being adapted to move longitudinally through the slots as the release sleeve is moved into an outer piston locking position. The housing 95 is secured to the chassis by means of a cylindrical sleeve member 99 fastened to each respectively as by stud screws 100 threaded into the sleeve and having projecting inwardly therefrom stud portions 101 suitable for intersecting radially arranged bores provided therefor in the chassis and forward housing members respectively.

Extending rearwardly from the chassis and preferably formed integral therewith is a substantially horizontal flange section 105 from which extends outwardly a flange portion 106 thereby forming about the periphery of the chassis an annular recess 107 wherein is arranged a number of the fluid connections to the mechanism as illustrated, for example, in Fig. 5 of the drawings.

Figure 7:
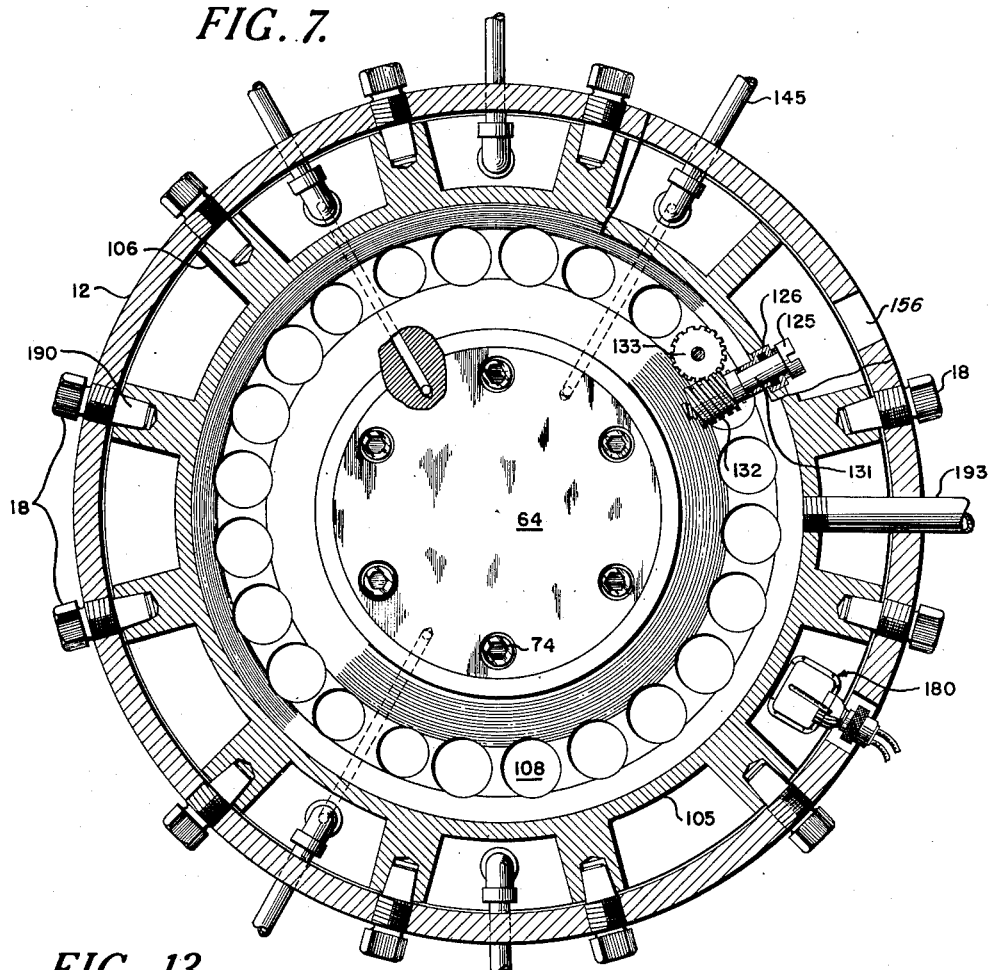
Fig. 7 is a view of the release mechanism taken along line 7—7 of Fig. 5.

In order that air may be communicated from the high pressure chamber 17 through the chassis to the base of the test piston, suitable openings or ports are provided in the chassis at 108, Fig. 7, the flow of air therethrough passing about the cylinder 75 to the base of the test piston by way of a throttling head assembly generally designated 110 supported on and carried by the shaft 67 of the piston to which the head assembly is secured as by the threaded connection 111.

The throttling head is comprised of an oval shaped cap or head piece 112 adapted to be received into the concavely formed base end portion 44 of the test piston, as the head is projected therein by forward movement of the piston 63 thereby to reduce to the minimum the air volume between the head and piston base. Provided about the periphery of the cap 112 is a plurality of splines or grooves 113 arranged in axial alignment with a corresponding number of similar grooves 114 formed about the edge of an annular body member 115 to which the cap is secured as by the threaded surface 116. Interposed between the cap and body and adapted to journal about a shoulder 117 provided on the latter, is an annular orifice plate 118 having therein a number of openings or ports 119 adapted, when moved selectively into or out of communicative adjacency with the grooves in the cap and ring members respectively, to control the flow of air therethrough as it passes to the base of the test piston from the high pressure chamber 17 thereby to effectively regulate the acceleration of the test piston following the release thereof for producing in the test object the conditions of shock desired.

Figure 9:
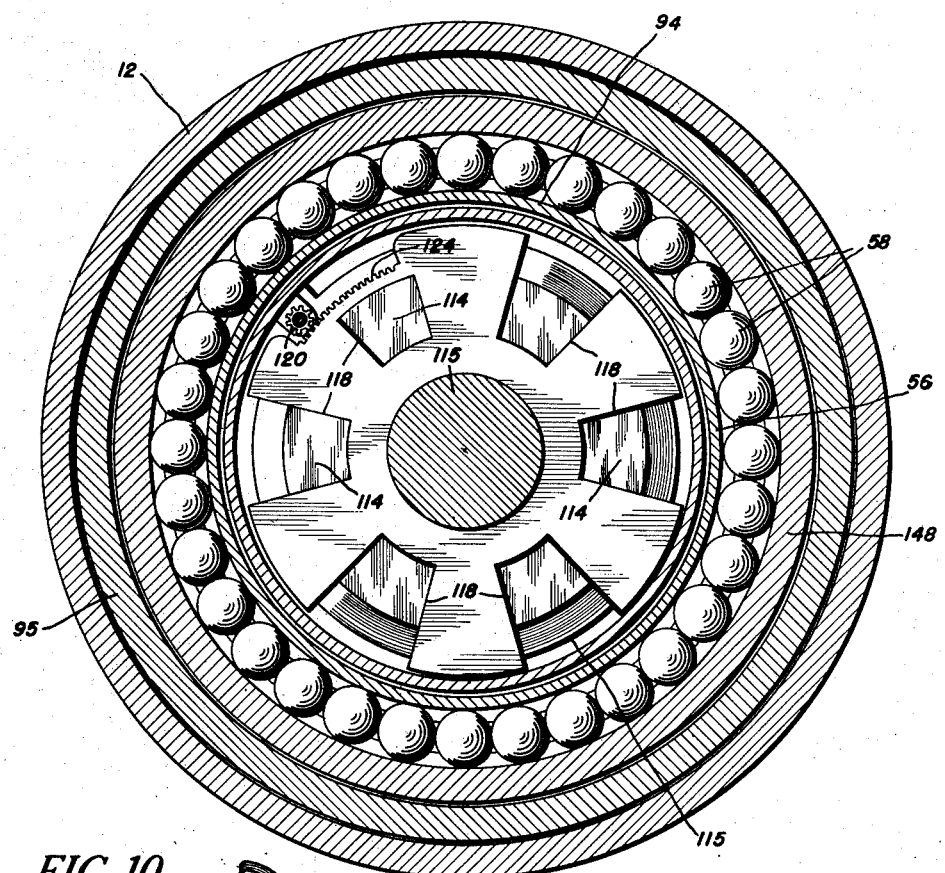
Fig. 9 is a view of the release mechanism taken along line 9—9 of Fig. 5.

Rotation of the orifice plate 118 is accomplished by means of an elongated gear 120 supported, as by studs 121 and 122, from the inner surface of the ball retaining ring 94, the latter stud being removably secured to the forward face of the ring as by screws 123. The gear 120 is provided with teeth suitable for meshing with teeth 124 formed in the outer periphery of the plate, Fig. 9, whereby the plate may be rotated by the gear selectively through a connection including an adjustment screw 125 adapted for journaling within a bearing member 126 therefor secured as by welding at 127 to the horizontal flange section 105 of the chassis. Secured as by pin 130 to the shaft 131 of the screw 125 is a worm gear 132 arranged in meshing engagement with a gear 133 fixedly secured to a shaft section 134 supported by and adapted for journaling within an elongated bearing member 135 therefor attached, as by welding, to the chassis at 137. A connecting linkage comprising a shaft section 138 and universal couplings 139 and 140, provide means for communicating motion of the adjustment screw 125 to the shaft section 141 of the gear whereby the plate may be adjustably rotated thereby. An opening 156, Fig. 5, is provided in the barrel body adjacent the head of the screw through which a screw driver or like tool may be inserted for rotation of the screw to the position of orifice plate adjustment desired.

The ball release sleeve 60 is equipped with an annular flange portion 142 secured thereto as by bolts 146 and adapted to slideably bear against the inner surface of an outer sleeve member 143 thereby to form to the rear end face of the release sleeve a chamber 144 to which fluid, such for example as oil or the like, may be admitted through a port connection 145 therewith. The release sleeve is initially retained in a retracted position, Fig. 6, until such time as the link 56 of the test piston has moved to seated position within the release mechanism whereupon oil is thereafter admitted under pressure to chamber 144 for forcing forwardly the release sleeve 60 carrying therewith into operative relation with the locking balls 58 the inclined surface 147 of a camming ring 148 secured to the forward end of the sleeve as by threads 149.

The freeing of the piston is accomplished by rearward movement of the sleeve 60 sufficiently for the balls 58 to become disengaged of the flange 59 of the piston link thereby allowing the piston to accelerate through the barrel, the peak acceleration being predetermined by the pressure of the air thereagainst at the time of such release.

In order to simulate both the peak acceleration and the rate at which the peak is reached, it is provided that the release sleeve 60 may be accelerated to release at a controlled rate thereby causing accelerated disengagement of the balls 58 with the piston link over a predetermined interval of time and terminating in the peak acceleration value as the piston link is freed of the last restraining effects of the locking balls therewith. The interval of time required for the test piston to reach peak acceleration is controlled by the rate the cam surface 147 of the ring is carried by the release sleeve from the path of the outwardly moving balls 58 as they are cammed from locking engagement with the piston link by the inclined surface 149 thereon.

To vary selectively the rate at which the cam surface 147 is disengaged of the locking balls at the time of piston release, air of a chosen pressure is applied through a fluid connection 150 to the forward face of an extending flange portion 151 of the sleeve from within a chamber 152 formed in adjacency to the flange by a fixed flange member 153 extending inwardly from a sleeve 154 arranged in abutment to sleeve 143. A plurality of bores 155 provided in the forward face of the flange 151 serves to increase the volume of the chamber 152 whereby the pressure of the air therein required to accelerate the sleeve over a predetermined travel may be initially reduced.

To secure the sleeve against rearward movement as the pressure of the air within chamber 152 is increased to a value required of the test, a plurality of balls 157 are arranged within apertures provided therefor in an annular collar 158 and adapted to be driven outwardly therefrom to engage the inner ring section 98 of the sleeve by forward movement of a shuttle member 159 having thereon an inclined surface 160 effective, as the shuttle is moved forward, to engage the inner surface of the balls for camming them outwardly to the position indicated in Fig. 5 thereby securing the sleeve 60 with the chassis to which the collar 158 is secured as by threads 161. The shuttle is moved to sleeve locking position by forward movement of the piston 63 as pressure is applied from the controls of the device to the rear cylinder volume 77 forcing outwardly the piston and head assembly attached thereto, the latter having thereon a rearwardly extending shuttle actuating member 162 secured thereto as by bolts 163 and including an outwardly extending flange portion 164 effective, as it is carried forward, to engage the rear end face of the shuttle to move it therewith to the position indicated in Fig. 5.

Figure 6:
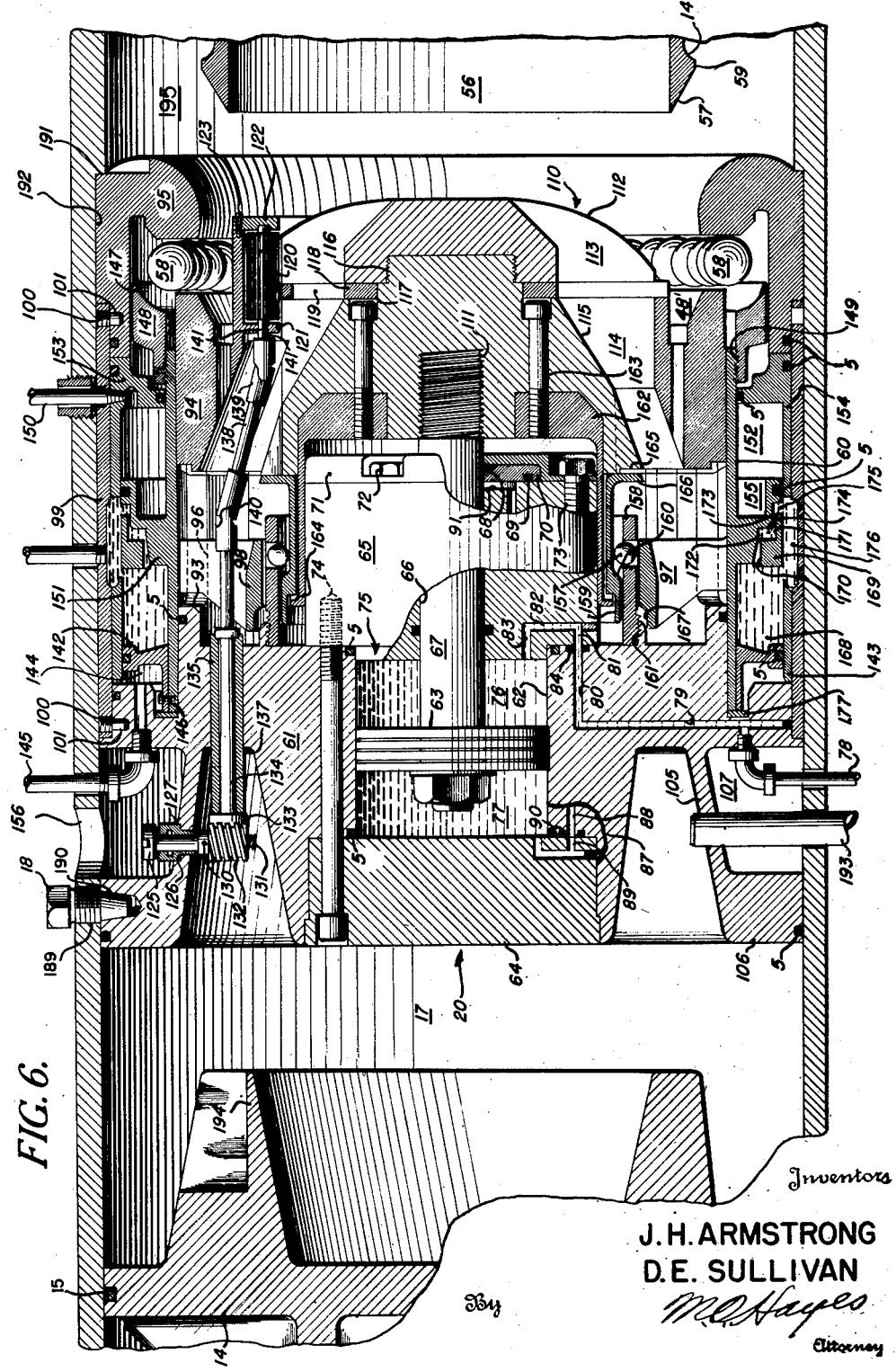
Fig. 6 is a view partly in section and partly in elevation of the release mechanism as arranged in the barrel immediately following the disengagement of the test piston therefrom.

Provision is made for releasing the sleeve ring 98 of the balls 157 by the application of fluid pressure to the forward volume 76 of the cylinder forcing inwardly the piston and head assembly, the latter having thereon an extending flange portion 165 effective to engage the forward flange equipped end 166 of the shuttle whereby the shuttle is driven rearward therewith to the position indicated in Fig. 6 to allow the balls 157 to be cammed free of the sleeve ring by the inclined surface 167 thereon thereby to allow the sleeve to accelerate to release by pressure of the air within chamber 152. Before the releasing of the sleeve in the manner described, the oil is drained from chamber 144 and if required, a partial vacuum may be drawn thereon to reduce the quantity of air therein required to compress before the rearwardly moving flange 142 of the sleeve as it accelerates to release position.

Figure 8:
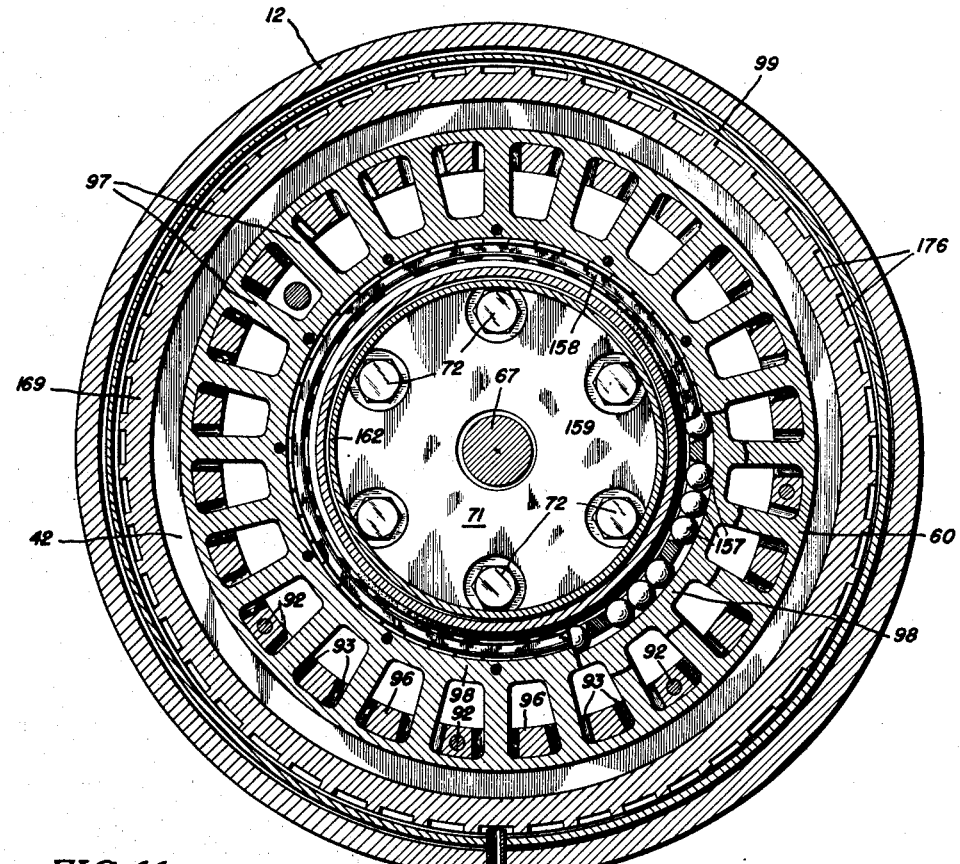
Fig. 8 is a view of the release mechanism taken along line 8—8 of Fig. 5.

To decelerate the sleeve after a predetermined travel thereof toward release position, a quantity of liquid, such for example as oil or the like, is retained within a chamber 168 closed by the flanges 142 and 151 and into which projects a stopping unit 169 provided as an internal flange of sleeve 143 and having thereon shoulder surfaces 170 and 171 formed reversely to similar shoulders 172 and 173 provided on the rear face of flange 151, the shoulders becoming effective to trap a quantity of oil therebetween at 174 and 175, Fig. 6, as the surfaces thereof are carried into operative adjacency as the release sleeve 60 is accelerated to release position, the trapped oil therebetween reducing to a near stop the rearward movement of the sleeve, with the oil being thereafter gradually forced behind the stopping unit by way of restricting orifices 176, Fig. 8, formed as milling cuts about the outer surface of sleeve 143. A shock pad or ring 177 arranged within an annular recess formed in the forward surface of the chassis in alignment with the rear end face of the sleeve 60 operates to bring the sleeve to rest at the completion of its rearward stroke.

If the rate of approach to peak acceleration is not required of a specific test, the pressure within chamber 152 may be allowed to remain at atmospheric while the sleeve 60 is moved gradually to release by the extending flange portion 166 of the shuttle as the shuttle is carried rearward by the piston and head assembly as heretofore described, the peak acceleration effect of the test occurring the instant the balls 58 become completely disengaged of the shoulder 59 of the piston link.

Figure 10:
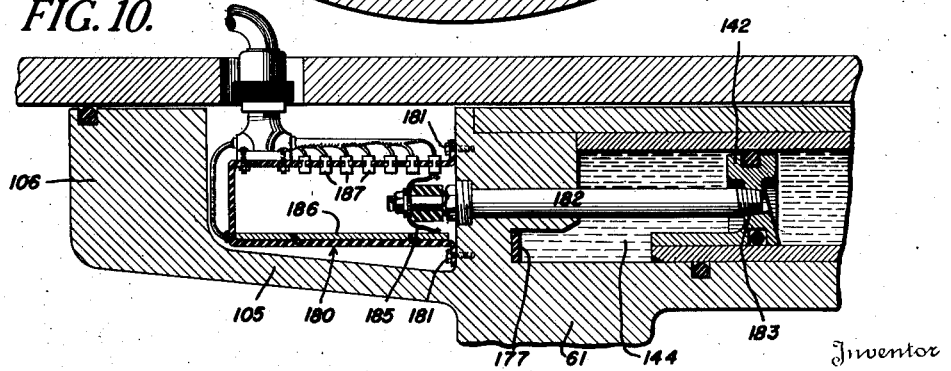
Fig. 10 is a fragmentary view in section through the sleeve position indicator switch secured to the afterbulkhead and release sleeve assembly respectively.

In order that the position of the release sleeve within the mechanism may be known to the operator at all times, a multiple contact switch 180 is secured to the chassis at 181, Fig. 10, and having extending forwardly therefrom an actuating member 182 secured as by threads 183 to the flange portion 142 of the sleeve 60 whereby a spring contact member 185 is driven by the sleeve between a continuous contact strip 186 and a segmented strip 187 for closing respective circuits to signal lamps provided on the control panel of the device thereby to indicate the position of the sleeve, or the direction and rate of travel thereof, if moved slowly into or out of piston locking position.

Adapted for securing the release mechanism 20 within the barrel, is the plurality of bolts 18 threaded therewith at 189, and having tapered stud portions 190 suitable for connecting with correspondingly formed bores provided therefor about the periphery of flange 106 of the chassis thereby to retain the release assembly in abutment to a positioning flange 191 formed as a termination of counterbore 192 wherein is movable the adjustable bulkhead 14.

Air under pressure is admitted to the high pressure chamber 17, formed between the bulkhead and release mechanism, by means of a fluid connection therewith at 193, pressure from the chamber being thereafter communicated about the mechanism of the release to the base of the test piston through the louvres and orifice plate of the throttling head assembly 110.

A forwardly projecting annular flange section 194 forming a part of the adjustable bulkhead 14 is adapted to be received into a correspondingly formed recess in the rear face of the chassis as the bulkhead is moved into close adjacency therewith thereby to reduce to the minimum the air volume of chamber 17 for producing certain conditions of test.

Conventional O rings are employed throughout the device where high pressure seals are required and are referred to generally by the numeral 5 wherein not otherwise numbered for the purpose of making specific reference thereto.

As the piston is released to accelerate through the barrel before the expanding air from within chamber 17, the air volume in the barrel chamber 195 before the piston is compressed thereby to gradually decelerate to a stop the piston within the barrel without producing in the apparatus under test and carried thereby effects of secondary shock comparable, in many respects, to that initially applied thereto at the time of piston release.

Figure 13:
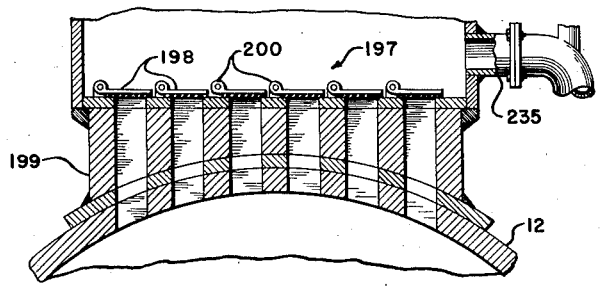
Fig. 13 is a cross sectional view through the flap valve assembly illustrating its arrangement with respect to the tank and barrel assemblies.

In order to reduce oscillation of the piston as the pressure within the barrel acting thereon becomes equalized following the completion of the piston's forward stroke, a pressure tank 196, Figs. 1 and 3, is arranged in fluid communication with the barrel chamber 195 through an interconnecting check-valve assembly generally designated 197, Fig. 13, and including a plurality of flap valve members 198 hingedly secured to a housing 199 therefor at 200 and adapted, as the pressure of the air within the barrel chamber ahead of the piston is increased, by movement of the piston thereagainst, to exceed by a predetermined value the pressure within the tank, to lift the flaps of the valves 198 from their seats to pass air from the barrel to the tank until the pressure of air against the surfaces of the flaps becomes substantially equalized whereupon the flaps drop to their seats to trap within the tank the air now under compression therein thus preventing it returning to the tank to relieve its energy to the forward surface of the piston causing the oscillation thereof referred to as the pressures within the barrel to the surfaces of the piston reaches equilibrium.

The pressure tank is comprised of an elongated cylinder 202, the ends thereof being closed as by coverplates 203 and 204 preferably welded thereto at 205 and 206 respectively. Provided in the coverplate 203 is an oval shaped manhole 207 through which is inserted a removable cap piece 208 for being drawn into closing position with the inner surface of the hole as by spanner brackets 210 as nuts 211 are tightened upon bolts 212 secured as by welding to the forward face of the cap. A pressure seal is maintained between the cap and plate as by suitable gasket material in the usual manner of such closures. The tank is supported upon the barrel as by perforated flange sections 213 welded to the tank and barrel respectively at 214 and 215 with the entire assembly being mounted for recoiling upon rollers 216 arranged within cradle-like supports therefor provided upon pillow blocks 217. The rollers are adapted for being driven upwardly upon the inclined surfaces of the cradle as the barrel recoils responsive to release of the piston therein, the rollers to thereafter return to the base of the cradle as the inertia of the barrel is spent.

Figure 11:
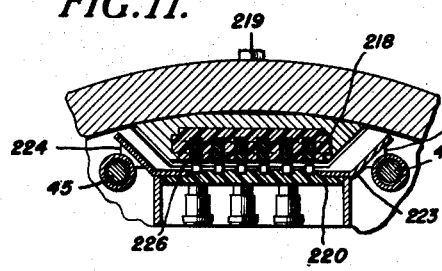
Fig. 11 is a fragmentary view in cross section through the barrel and contact strip arranged therein.
Figure 12:
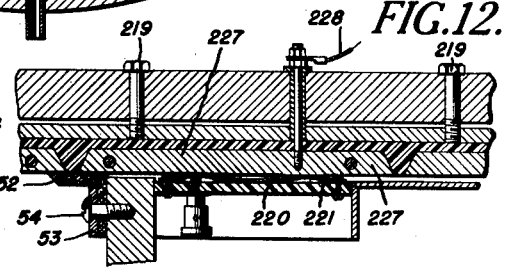
Fig. 12 is a fragmentary sectional view through the contact member carried by the piston and its arrangement with respect to the barrel supported contact strip.

In order that electrical communication may be had with the test piston and apparatus carried thereby during the travel of the piston through the barrel, a multiple strip contact member 218 is secured, as by screws 219, to the upper inner surface of the barrel and adapted to remain in electrical contact with the piston through an insulating plate member 220 carried by the piston and including a multiplicity of bowed spring contact members 221, Figs. 11 and 12, adapted, as the piston moves through the barrel, to bear in rubbing contact with the strips of member 218 whereby electrical signals may be communicated from the piston and apparatus carried thereby to recording apparatus such, for example, as a six trace oscilloscope located preferably in the control panel of the device. The contact carrying plate 220 is mounted within a recessed portion of the piston, Fig. 11, and suitably secured thereto as by a substantially U-shaped bracket member 223 arranged to span the connecting rods 45 of the piston to which the bracket is secured as by welding to the rods at 224.

Electrical connections made with inertia responsive strain gauges and other such instrumentation carried by the piston as well as connections made directly with the various parts of the apparatus under test, provide a source of data for the recorder whereby the characteristics of the shock effects produced and the response of the test apparatus thereto may be recorded relative to a recorded reference base line as established by a short interval of operation of the recorder prior to the piston release.

The strip 226 of the contact member 218 is comprised of insulated segments 227, Fig. 12, each segment being respectively connected, as by a lead 228, to a common timing circuit of the recorder to which electrical impulses are communicated for producing on the record time indications corresponding proportionately in spaced relation to the time of contact of the moving piston with the respective segments of the strip whereby the velocity of the piston may be known at any selected position during its travel through the barrel relative to the response of the test object thereto as provided by other recordings made concurrently therewith, as previously described.

The range of shock application may be increased by supplying air under pressure into the barrel before the piston prior to release thereof whereby pressure is built up in the pressure tank 196 by way of check valve 197. With this arrangement the extent of accelerated travel of the piston in the barrel may be substantially reduced. In order to increase the accelerated travel of the piston, a partial vacuum may be drawn in tank 196 as by the steam ejector 237 supplied with steam as from 236 and connected to the tank as at 235.

Describing briefly the operation of the device of Fig. 1, the piston 41 having mounted therein the part 42 to be tested, is first inserted within the end of the barrel 35 which is thereafter closed as by the cap piece 36 whereupon air is then admitted by way of the port 50 between the piston and the cap for urging the piston gradually along the barrel to the position for coupling, by way of the link 56, with the release mechanism generally designated 20.

As the piston link 56 moves into the annular recess formed therefor in the forward end of the release mechanism, the balls 58 are caused to be cammed outwardly by the inclined surface 57 of the link to thereafter be cammed downwardly behind the link shoulder 59 by forward movement of the locking sleeve 60 as pressure admitted by way of the port 145 is applied to the rear face of the flange section 142 of the sleeve from within the chamber 144 for urging the sleeve forward or in locking position above the balls 58, Fig. 5. Forward movement of the sleeve in this manner prevents movement of the balls from the flange 59 of the link whereby the link and piston attached thereto are thereby secured within the barrel as air under pressure is admitted to the adjustable pressure chamber 17 and to the rear face of the piston by way of the regulated orifices in the plate 118.

After the piston has been secured to the release mechanism by the balls 58 in the manner aforedescribed, the sleeve 60 is thereafter secured in its ball locking position, Fig. 5, by the inner ring section 98 of the sleeve being engaged by the balls 157 as the latter are cammed outwardly into securing position with the ring section by forward movement of the shuttle member 159 upon which the shoulder 160 thereon, Fig. 6, extends for engaging the inner surfaces of the balls for directing them outwardly to connect with the ring section as the shuttle is carried in a forwardly direction by forward movement of the shuttle actuating member 162.

Movement of the shuttle actuating member 162 is controlled by the operator by controlling the hydraulic response of the piston 63 of the hydraulic cylinder 75 and to which the shuttle actuating member is attached. By directing fluid into the chamber 77 of the hydraulic cylinder 75 the piston 63 thereof is extended in a forward direction thereby carrying the throttling head 110 and shuttle actuating member 162 attached thereto into position for moving the shuttle to sleeve securing position.

As fluid is directed into the the forward volume or chamber 76 of the cylinder, the piston 63 is retracted for bringing the flange section 165 of the throttling head 110 into engaging position with the forward flange section 166 of the shuttle 159 whereby the shuttle is moved to the position of Fig. 6 for allowing the balls 157 to be cammed inwardly from their engagement with the ring section 98 of the sleeve whereby the sleeve is freed to move to its release or ball freeing position.

After the locking sleeve 60 has been secured in the manner aforedescribed in a forward position for securing the test piston to the release mechanism and the required pressure for the test to be conducted has been admitted, by way of the port 193 to the high pressure chamber 17, gas under pressure is then admitted by way of port 150 to the chamber 152 formed to the forward face of the flange section 151 of the sleeve, Fig. 6, for increasing the pressure thereagainst to a value required to accelerate the sleeve to ball-freeing position when disengaged from the retaining balls 157 controllable by the operator from the panel 11.

Upon the release of sleeve 60 in the manner heretofore described, the sleeve is accelerated from its locking position with the balls 58 for freeing the test piston and thereafter decelerated by connecting with the stopping lug 169 extending inwardly from the ring section 99 and against which oil within the chamber 168 is trapped therebetween and the flange 151 of the sleeve as the latter nears completion of its rearward stroke. As the sleeve 60 moves from above the balls 58, the piston link 56 is disengaged from the release mechanism 20 to allow the piston to accelerate through the barrel in response to the pressure thereagainst thus applied from the pressure chamber 17.

As the piston approaches the cap closed end of the barrel, the pressure of the air before the piston and within the barrel 35 is compressed to the extent of being driven through the flap valves 198, Fig. 13, to within the high pressure tank 196 whereupon the valves close to prevent the return of this gas to the forward face of the piston and thusly oscillatory motion of the piston within the barrel is considerably reduced as a state of pressure equilibrium is attained.

After the piston has come to rest, the port 50 is opened to allow the pressure between the piston and the release mechanism to urge the piston in the direction of the cap 36 whereupon as the piston reaches the end of the barrel the pressure may be exhausted from the system and the piston extracted for the examination of the part under test.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. An air gun of the character disclosed comprising a barrel, a piston in the barrel, means controllable at will for supplying air under pressure to said piston to accelerate the same within the barrel, locking means disposed about the axis of the piston, means including a sleeve movable from a piston releasing position to a position for locking the piston against movement in the barrel in response to said pressure, said sleeve disposed slideably in said barrel to releasably engage said locking means, and means controllable at will for accelerating said sleeve to said piston releasing position at a predetermined rate, said sleeve being constructed and arranged to cause the piston to be accelerated to free release thereof at a peak value proportional to the pressure of the air on the piston and in predetermined time delayed relation proportional to said predetermined rate of acceleration of the sleeve.

2. An air gun of the character disclosed comprising, an elongated barrel closed at both ends thereof, a piston disposed in said barrel and adapted to carry an object to be tested, a sleeve, means including a plurality of balls movable by said sleeve into locking engagement between said piston and barrel to secure the piston in spaced adjacency to one end of the barrel thereby to form a pressure chamber therebetween, means responsive to air supplied under pressure to said chamber for accelerating said piston in the barrel as the piston is released by movement of said sleeve to a position for releasing said balls, said acceleration of the piston at the time of free release thereof reaching a peak value proportional to the maximum pressure of the air in said chamber, and means controllable at will and responsive to air supplied under pressure thereto for accelerating said sleeve to said ball releasing position selectively in accordance with the pressure applied to said last named means whereby the rate at which said peak acceleration value is reached is controlled by said acceleration of the sleeve.

3. An air gun of the character disclosed comprising a barrel, a piston in the barrel, an annular link attached to said piston and having a camming flange, an annular sleeve, a plurality of balls restricted to radial movement in said barrel and arranged concentrically with respect to said link and actuatable by movement thereover of said sleeve into engagement with said camming flange for securing said piston to said barrel, an annular camming surface on said sleeve and engageable by the balls as the sleeve is withdrawn therefrom and the balls are cammed outwardly of the link by said camming flange upon movement of the piston toward free release position thereof, means responsive to air under pressure for withdrawing said sleeve at a predetermined accelerated rate selectively in accordance with the pressure of the air applied thereto, means for securing said sleeve to the barrel as said pressure is developed on said withdrawing means therefor, means for releasing said sleeve securing means for free release of said piston, and means for applying a predetermined degree of air pressure to said piston whereby the acceleration of the piston at the time of free release thereof reaches a peak of predetermined value, said camming flange and said camming surface being constructed and arranged to cause free release of the piston in predetermined time delayed relation to engagement of the balls with said surface and proportional to said rate of acceleration of the sleeve.

4. An air gun of the character disclosed comprising a barrel, a piston slideable in the barrel and having a locked position and a free release position therein, an annular link attached to said piston and having a camming flange, an annular sleeve, a plurality of balls restricted to radial movement within the barrel and arranged concentrically with respect to said link and movable into engagement with said camming flange by movement thereover of said sleeve thereby to lock said piston to said barrel, an annular camming surface on said sleeve and engageable by the balls as the sleeve is withdrawn therefrom and the balls are cammed outwardly of the link by said camming flange thereon upon movement of the piston toward said release position, means responsive to air under pressure for withdrawing said sleeve at a predetermined accelerated rate selectively in accordance with the pressure of the air applied thereto, means for securing said sleeve to the barrel as said pressure is developed on said sleeve withdrawing means, means for releasing said sleeve securing means, and means for applying a predetermined degree of air pressure to said piston whereby the acceleration of the piston at the time of free release thereof reaches a peak of predetermined value, said camming flange and said camming surface being constructed and arranged to cause free release of the piston in predetermined time delayed relation to engagement of the balls with said surface and proportional to said rate of acceleration of the sleeve.

5. An air gun of the character disclosed comprising a barrel, a piston having a locked position and a free release position in the barrel, an annular link attached to said piston and having a camming flange, an annular sleeve movable in said barrel, a plurality of balls restricted to radial movement in the barrel and arranged concentrically with respect to said link and moveable into engagement with said camming flange by movement thereover of said sleeve to lock said piston to said barrel in said locked position thereof, an annular camming surface on said sleeve and engageable by the balls as the balls are cammed outwardly of the link by said camming flange thereon upon movement of the piston toward said free release position thereof, fluid means for moving said sleeve into ball locking position, means responsive to air under pressure for withdrawing the sleeve from the balls at a predetermined accelerated rate selectively in accordance with the pressure of the air applied thereto, means for securing said sleeve to the barrel as said pressure is developed on said withdrawing means therefor, means for releasing said sleeve securing means, and means for applying a predetermined degree of air pressure to said piston whereby the acceleration of the piston at the time of free release thereof reaches a peak of predetermined value, said camming flange and said camming surface being constructed and arranged to cause free release of the piston in predetermined time delayed relation to engagement of the balls with said surface and proportional to said rate of acceleration of the sleeve, and throttle means for controlling flow of the air to said piston upon release thereof.

6. In an air gun having a barrel and a piston having means for carrying an object to be tested for acceleration shock, as the piston is accelerated in the barrel, responsive to air supplied under pressure thereto, the improvement comprising a two stage piston release mechanism, said mechanism including an annular link secured to the piston, a plurality of balls arranged about said link for movement radially of said barrel into and out of engagement with the link, said link having a ball camming flange for camming the balls out of engagement therewith as the piston is accelerated in the barrel, a sleeve movable over said balls to lock the same in engagement with said link and having an annular camming surface engageable by the balls as the sleeve is withdrawn therefrom and the balls are cammed outwardly of the link, pressure responsive means for withdrawing the sleeve to cause said withdrawal thereof at a predetermined accelerated rate selectively in accordance with the degree of pressure applied to said last named means, means for securing said sleeve to the barrel as said pressure is increased to a predetermined degree and means for releasing said sleeve securing means, said sleeve being effective to retain the piston against movement in the barrel until the sleeve is withdrawn sufficiently to bring said camming surface thereof into engagement with the balls, said camming flange and said camming surface being constructed and arranged to accelerate the piston to peak acceleration at the time of free release thereof in predetermined time delayed relation to said engagement of the balls with said camming surface, said time delayed relation being proportional to said rate of acceleration of the sleeve and said peak acceleration being proportional to the degree of air pressure applied to the piston.

7. A device of the character disclosed adapted to apply acceleration shock to apparatus under test including, in combination, a mount, an elongated barrel having a muzzle end and a breech end and arranged for recoil upon said mount, a piston closely fitted within the barrel and constructed and arranged to support the apparatus to be tested, said piston being initially disposed in spaced adjacency to the breech end of said barrel and arranged to be driven under pressure to the muzzle end of the barrel, a bulkhead slideably arranged within the barrel for closing the breech end thereof, said piston and bulkhead forming therebetween a pressure chamber, means for adjusting the bulkhead slideably in the barrel thereby to vary the volume of said pressure chamber, means including a port for admitting air under pressure into said pressure chamber, a release mechanism arranged in said pressure chamber and adapted to releasably secure said piston to said barrel, means for operating said release mechanism to disengage said piston from the barrel thereby to cause the piston to accelerate towards the muzzle end of the barrel, said acceleration of the piston reaching a peak value proportional to the pressure applied thereto by the air in said chamber, a cap for closing the muzzle end of said barrel whereby the air within the barrel before the accelerating piston may be compressed to decelerate the piston to a stop as the pressures on the fore and aft surfaces thereof become equalized, a pressure relief tank, fluid communicating means connecting said tank with the muzzle end of said barrel, and a check-valve arranged in said fluid communicating means adapted as the pressure before the moving piston is increased to open and exhaust into the tank a portion of the air from said barrel, said valve being constructed and arranged to cut off communication to said tank as the pressures on the opposite surfaces of the valve become substantially equal.

8. A device of the character disclosed adapted to apply acceleration shock to apparatus under test comprising, in combination, a mount, an elongated barrel having a muzzle end and a breech end and arranged for recoil on said mount, said barrel having a closely fitting piston disposed and adapted for movement under pressure therein, said piston having a link for attaching the piston to the barrel, a release mechanism arranged in said barrel and fixedly secured thereto in predetermined spaced-adjacency to the breech end thereof and including a recess for receiving therein said attaching link of the piston, a plurality of balls arranged radially about said link for locking the link in said recess, a cylindrical sleeve disposed about said balls and having thereon a cam surface effective to cam the balls inwardly into locking engagement with the link, a fluid system for actuating said sleeve to ball locking position, a bulkhead slideably arranged in the barrel in spaced relation to the locked piston therein thereby to form a pressure chamber therebetween, means for adjusting the position of the bulkhead along the barrel thereby to change the volume of said chamber selectively in accordance with the adjusted setting of the bulkhead, a source of air under pressure, means for admitting air from said source into said chamber to increase the pressure therein to a value selectable for the test, means for releasing said piston for accelerated movement toward the muzzle end of the barrel and including a second fluid system constructed and arranged to accelerate the sleeve from piston locking to piston freeing position at a rate selectable for producing in the released piston the approach to peak acceleration effects desired, a cap for closing said muzzle end of the barrel whereby the air within the barrel before the accelerating piston may be compressed to decelerate the piston to a stop as the pressure fore and aft thereof becomes equalized, a pressure release tank, means connecting said tank in fluid communication with said barrel at a point adjacent the muzzle end thereof, and a check valve arranged in said fluid communicating means and adapted as the pressure before the moving piston is increased to operate to exhaust into the tank a portion of the air from said barrel, said valve being constructed and arranged to cut off communication between said tank and barrel as the pressure on opposite surfaces of the valve becomes substantially equalized thereby to substantially reduce oscillation of the piston.

9. A device of the character disclosed adapted to apply controlled acceleration shock to apparatus under test comprising, in combination, a mount, an elongated barrel arranged for recoil on said mount, closures for the ends of said barrel including a removable cap for closing one end thereof, a bulkhead slideably arranged therein for closing the other end of said barrel, a piston having an attaching link and adapted for supporting thereon the apparatus to be tested, said piston being disposed for movement in said barrel responsive to pressure applied thereto and being initially retained in predetermined spaced adjacency to the bulkhead closed end of said barrel, means forming an adjustment for said bulkhead for varying selectively the position of the bulkhead with respect to the piston thereby to form therebetween a high pressure chamber of an adjustable volume, a source of air under pressure, a fluid connection for admitting air from said source to said chamber for increasing the pressure therein to a value suitable for the test, a release mechanism disposed in said chamber and fixedly secured to said barrel in adjacency to said piston when the piston is in said initial position thereof, said release mechanism having therein a recess for receiving said link of the piston, a plurality of balls arranged radially about the link, a sleeve arranged in adjacency to the balls and including a cam surface adapted upon forward movement of the sleeve to cam inwardly the balls into locking engagement with the link thereby to lock the piston to the barrel as pressure within the chamber is increased to a value required of the test, means including a fluid system for imparting said forward movement to said sleeve to lock the piston, means including a second fluid system for accelerating the sleeve rearwardly thereby to release and accelerate the piston through the barrel, said acceleration of the piston at the time of release thereof reaching a peak value predetermined by the initial pressure of the air within the chamber at the time of release, said second fluid system being constructed and arranged to accelerate said sleeve rearwardly at a value sufficient to cause a predetermined rate of approach to peak acceleration of the piston, a cap for closing the muzzle end of said barrel whereby the air within the barrel before the accelerating piston may be compressed to decelerate the piston to a stop as the pressure on the fore and aft surfaces thereof becomes equalized, a pressure relief tank, fluid communicating means connecting said tank with the muzzle end of said barrel, and a check valve arranged in said fluid communicating means and adapted as the pressure before the moving piston is increased to open and exhaust into the tank a portion of the air from said barrel, said valve being constructed and arranged to cut off communication through said tank as the pressure on opposite surfaces of the valve becomes substantially equal.

10. A device of the character disclosed adapted to apply controlled acceleration shock to apparatus under test comprising, in combination, a mount, an elongated barrel arranged for recoil on said mount, a removable cap for closing one end of the barrel, a bulkhead slideably arranged therein for closing the other end of said barrel, a piston adapted for supporting thereon the apparatus to be tested disposed for movement in said barrel responsive to pressure applied thereto and initially disposed in predetermined spaced adjacency to the bulkhead closed end of said barrel, means forming an adjustment for said bulkhead for varying selectively the position of the bulkhead with respect to the piston thereby to form therebetween a high pressure chamber of an adjustable volume, a source of air under pressure, a fluid connection for admitting air from said source to said chamber for increasing the pressure therein to a value suitable for the test, a release mechanism arranged in said chamber in adjacency to said piston and adapted to secure said piston to said barrel as the pressure in the chamber is increased, means forming a part of said release mechanism for effecting the disengagement of the piston therefrom to allow accelerated movement of the piston through the barrel in the direction of the cap closed end thereof whereby the air within the barrel before the accelerating piston is compressed to decelerate the piston to a stop as the pressure within the barrel fore and aft of the piston becomes equal, a pressure relief tank, fluid communicating means connecting said tank with the cap closed end of said barrel, and a check-valve arranged in said fluid communicating means and adapted as the pressure before the moving piston is increased to open the valve and exhaust into the tank a portion of the air from said barrel, said valve being constructed and arranged to cut off communication through said tank as the pressure on opposite surfaces of the valve becomes substantially equalized.

JOHN H. ARMSTRONG.
DONAL E. SULLIVAN.

REFERENCES CITED

The following references are of record in the file of this patent:

UNITED STATES PATENTS

| Number | Name | Date |
|---|---|---|
| 1,355,448 | Menon | Mar. 30, 1920 |
| 2,182,369 | Barron | Dec. 5, 1939 |
| 2,484,844 | Nicholas | Oct. 18, 1949 |